Figure 1:
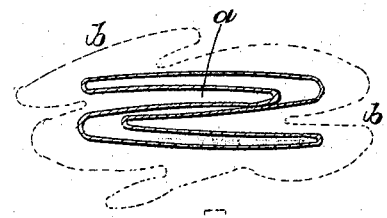

G. M. ALLERTON.

Inflated Rubber Articles.

No. 79,933.

Patented July 14, 1868.

Witnesses.
Geo. D. Walker
Chas. H. Smith

Inventor.
Geo. M. Allerton

United States Patent Office.

GEORGE M. ALLERTON, OF NEW YORK, N. Y.

Letters Patent No. 79,933, dated July 14, 1868.

IMPROVEMENT IN INFLATED RUBBER GOODS.

The Schedule referred to in these Letters Patent and making part of the same.

TO ALL WHOM IT MAY CONCERN:

Be it known that I, GEORGE M. ALLERTON, of the city and State of New York, have invented and made a certain new and useful Improvement in Hollow or Inflated India-Rubber Goods; and I do hereby declare the following to be a full, clear, and exact description of the nature of the said invention, reference being had to the annexed drawing, making part of this specification.

Heretofore, India-rubber goods have been made so as to be inflated to form life-preservers, and air-balls, and a variety of articles, such as cushions, pillows, &c. In all such articles heretofore made, the India rubber in its native or cured state has composed the article, and, in many instances, has been expanded by the pressure of air, or allowed to collapse when that pressure is allowed to escape.

In other instances, such inflated goods have been made of India-rubber cloth. In the first-named instances, the India rubber is liable to tear and break by sudden strain, or in consequence of wear when in use. In the last-named class of articles, the woven fabric or stockinet is exposed to heat in curing the India rubber, and thereby injured, and rendered weak and liable to break. Besides this, any color applied to the woven fabric or the surface of such goods as an ornament, is liable to become injured by the heat.

The nature of my said invention consists in an India-rubber bag, or other article to be inflated or distended, in combination with a separate covering of cloth, felt, or similar material, that supports the rubber fabric, and prevents injury to the same by the pressure or by wear, and such covering, not having been exposed to heat, retains its original strength and color, and the rubber, being separate, can be cured by heat in the most perfect manner.

My invention is applicable to air-pillows, balls, cushions, life-preservers, buoys, water-bags, sacks, hose, and other articles. A ball constructed on the plan herein described is exceedingly well adapted to stopping the flow of water or gas in large pipes, when required for repairs or other purposes. It can be inserted into the pipe through a comparatively small hole, and then expanded by water or air so as to completely fill the pipe, and thus stop all passage for the flow of water or gas.

Without the canvas covering, the rubber bag would elongate and burst before it could be made to exert any great pressure against the sides of the pipe. If made of rubber and cloth, and vulcanized in the usual way, the fibres of the canvas having been weakened by the vulcanizing process, the ball would burst under a moderate pressure. But with a rubber bag made separate, and used to expand a strong canvas cover unweakened by heat, the flow of water, under any ordinary pressure, can be readily and effectually stopped.

I have shown in the drawing, fig. 1, a section of an air-ball in collapsed condition. In this, $a$ represents the rubber air-bag, and $b$ the casing or covering, of woven fibrous material.

Figure 2:
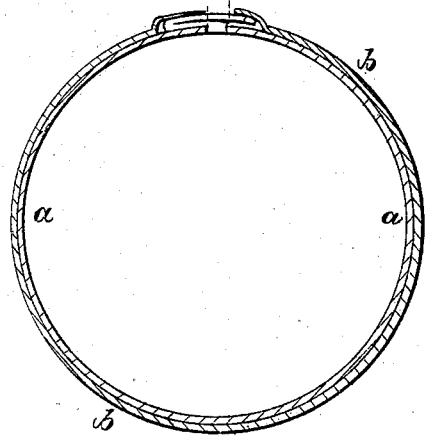

In fig. 2, a portion of an air-ball is shown in a distended condition, the India rubber, $a$, being within and supported by the covering $b$.

Heretofore, it has been usual to employ metal air-valves at the place where the air is forced in. These, however, are very liable to leak, either at the valve-seat, or where the rubber is fastened to the metal.

I employ an India-rubber tube for inflating the air-bag. This is attached to said air-bag, and the parts vulcanized together. This tube is sufficiently long to be easily applied to the mouth for inflating the air-bag, and by making one or two folds in said tube, the same becomes secure against the escape of the gas. I have shown in fig. 2 the air-tube folded and tucked under the cover $b$. The said tube is shown in red lines, in position for inflating.

What I claim, and desire to secure by Letters Patent, is—

The separate covering of cloth, felt, or similar material, in combination with the enclosed India-rubber article, as and for the purposes set forth.

In witness whereof, I have hereunto set my signature, this 12th day of February, A. D. 1868.

GEO. M. ALLERTON.

Witnesses:
CHAS. H. SMITH,
GEO. D. WALKER.